United States Patent
Narayan et al.

(10) Patent No.: US 8,560,710 B2
(45) Date of Patent: Oct. 15, 2013

(54) SYSTEM AND METHOD OF USING DIAMETER BASED SIGNALING TO ACTIVATE AND DEACTIVATE SUBSCRIBER CENTRIC, VISUALLY RENDERED, SERVICES

(75) Inventors: Pramodh D. Narayan, Naperville, IL (US); Mark D. Nielsen, Austin, TX (US); Lasith G. Perera, Lake Oswego, OR (US); Sri Ramanathan, Lutz, FL (US); Matthew A. Terry, Dunwoody, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 1386 days.

(21) Appl. No.: 12/178,831

(22) Filed: Jul. 24, 2008

(65) Prior Publication Data
US 2010/0020727 A1    Jan. 28, 2010

(51) Int. Cl.
*G06F 15/16* (2006.01)
(52) U.S. Cl.
USPC .......................................................... 709/229
(58) Field of Classification Search
None
See application file for complete search history.

(56) References Cited

U.S. PATENT DOCUMENTS

| | | | |
|---|---|---|---|
| 6,243,572 B1 | 6/2001 | Chow et al. | |
| 6,404,738 B1 | 6/2002 | Reininger et al. | |
| 7,079,499 B1 | 7/2006 | Akhtar et al. | |
| 7,194,554 B1 | 3/2007 | Short et al. | |
| 7,257,636 B2 | 8/2007 | Lee et al. | |
| 7,266,371 B1 | 9/2007 | Amin et al. | |
| 7,310,663 B2 | 12/2007 | Bellinger et al. | |
| 7,583,646 B2 | 9/2009 | Hua et al. | |
| 2003/0233329 A1 | 12/2003 | Laraki et al. | |
| 2004/0090969 A1* | 5/2004 | Jerrard-Dunne et al. | 370/395.54 |
| 2006/0178132 A1* | 8/2006 | Tammi et al. ................ | 455/411 |
| 2006/0253873 A1* | 11/2006 | Lim et al. ....................... | 725/62 |
| 2007/0047530 A1* | 3/2007 | Ayers et al. ................... | 370/356 |
| 2007/0127682 A1* | 6/2007 | Fleming et al. .......... | 379/221.08 |
| 2007/0133510 A1 | 6/2007 | Da Palma et al. | |
| 2007/0270123 A1 | 11/2007 | Cai et al. | |
| 2008/0010179 A1 | 1/2008 | Cai et al. | |
| 2008/0082455 A1 | 4/2008 | Cai et al. | |
| 2008/0256250 A1* | 10/2008 | Wakefield ..................... | 709/229 |

(Continued)

FOREIGN PATENT DOCUMENTS

EP    1 662 701    11/2005

OTHER PUBLICATIONS

Jyh-Cheng Chen, et al; "Fast Handoff in Mobile Virtual Private Networks"; copyright 2006 IEEE; Proceedings of the 2006 International Symposium on a World of Wireless, Mobile and Multimedia Newtworks.

(Continued)

*Primary Examiner* — Steven H Nguyen
*Assistant Examiner* — Jason Harley
(74) *Attorney, Agent, or Firm* — Matthew Chung; Roberts Mlotkowski Safran & Cole, P.C.

(57) ABSTRACT

A system and method is provided for providing using Diameter based signaling to activate and deactivate subscriber centric, visually rendered, services. The system is implemented in a computer infrastructure which includes computer executable code tangibly embodied on a computer readable medium. The executable code is operable to activate and deactivate subscriber centric, visually rendered, services using a Diameter based signaling protocol and support home subscriber server (HSS) based subscriber profiles that pertain to visual characteristics.

2 Claims, 3 Drawing Sheets

(56) References Cited

U.S. PATENT DOCUMENTS

2008/0268847 A1* 10/2008 Mukherjee et al. ........... 455/436
2009/0022285 A1 1/2009 Swanburg et al.
2011/0085646 A1 4/2011 Sigmund et al.

OTHER PUBLICATIONS

Srisakul Thakolsri, et al.; "Accounting Management for Session Mobility in an Ubiquitous Environment"; IWCMC'06, Jul. 3-6, 2006, Vancouver, British Columbia, Canada.; pp. 311-316.
Frank Eyermann, et al.; "Generic Accounting Configuration Management for Heterogeneous Mobil Networks"; WMASH'05, Sep. 2, 2005, Cologne, Germany; pp. 46-55.
Susana Sargento, et al.; "Integration of Mobility and QoS in 4G Scenarios"; Q2SWinet'07, Oct. 22, 2007, Chania, Crete Island, Greece; pp. 47-54.
Sok-Ian Sou; "Performance Analysis of Credit Re-authorization Schemes in UMTS Online Charging System"; IWCMC'07, Aug. 12-16, 2007, Honolulu, Hawaii, USA; pp. 55-60.
Office Action dated Apr. 5, 2012 for U.S. Appl. No. 12/190,270.
Office Action dated Aug. 18, 2011 for U.S. Appl. No. 12/190,270.
Final Office Action dated Mar. 20, 2013, in U.S. Appl. No. 12/190,270 (30 pages).
Offcie Action dated Oct. 19, 2012 in U.S. Appl. No. 12/190,270, 24 pages.
Notice of Allowance dated May 21, 2013, in U.S. Appl. No. 12/190,270; 12 pages.

* cited by examiner

SYSTEM AND METHOD OF USING DIAMETER BASED SIGNALING TO ACTIVATE AND DEACTIVATE SUBSCRIBER CENTRIC, VISUALLY RENDERED, SERVICES

FIELD OF THE INVENTION

The invention generally relates to a system and method of using Diameter based signaling to activate and deactivate subscriber centric, visually rendered, services.

BACKGROUND

Traditional consumer centric (as opposed to enterprise centric) telecommunications services have typically involved broad categories of services. For example, these services include voice services that are primarily delivered using handsets, both wired handsets and wireless handsets, as well as data services, which provide access to features such as SMS (Short Messaging Services) and access to the Internet. Increasingly, data services are also delivering digital media content such as music and video to handsets.

In both voice and data services, in most telecommunications networks, there is a proliferation of Service Delivery Platforms that has resulted in silo'ed network architecture with the following broad characteristics:

Subscriber data is scattered in a variety of different repositories in the telecommunications network;

Provisioning activities have to incorporate the "logic" necessary to provision subscriber information in all the multiple repositories;

Service Applications that provide the services have to look at these multiple repositories during their call flow invocation sequence; and The controls/policy associated with the services are managed by the services themselves, in adherence with the silo based architecture.

To address some of the above issues, the IMS (IP Multimedia Subsystem) architecture uses a central repository called the Home Subscriber Server (HSS). This central repository uses the Diameter protocol to provide access to this data, and to allow IMS defined nodes to subscribe to changes in subscriber information. However, the HSS based subscriber profile does not support any aspects of the subscriber profile that pertain to visual characteristics, such as the characteristics of a WAP page (Wireless Access Protocol) or a traditional portal rendered browser, such as a JSR 168 compliant portlet. While it is true that no large scale implementations of IMS networks currently exist, what is also true is that these network implementations have not in any significant way addressed the domain of visually rendered revenue generating network services.

Accordingly, there exists a need in the art to overcome the deficiencies and limitations described hereinabove.

SUMMARY

In a first aspect of the invention a system is implemented in a computer infrastructure which comprises computer executable code tangibly embodied on a computer readable medium. The executable code is operable to activate and deactivate subscriber centric, visually rendered, services using a Diameter based signaling protocol and support home subscriber server (HSS) based subscriber profiles that pertain to visual characteristics.

In embodiments, the computer readable medium is operable to activate and deactivate the visually rendered services in an IP Multimedia Subsystem (IMS) network. The computer readable medium is operable to integrate an existing master subscriber profile in the IMS network into domain or web based visually rendered services. The computer readable medium is operable to activate and deactivate the subscriber centric, visually rendered, services with an existing HSS infrastructure using a Sh sub-protocol. The computer readable medium is operable to handle authorization via the Diameter based signaling protocol. The computer readable medium is operable to provision and activate portlet functionality for wireless devices via an IMS network using extension to the Diameter based signaling protocol which consolidates user accesses into a unified call. The computer readable medium is operable to provide preference information to a carrier centric central subscriber services repository. The preference information contains the visually rendered revenue generating services pertaining to a layout of a WAP browser rendered page or a page based on portlets. The computer readable medium is operable to request profile changes in an HSS repository and ensure that the Diameter based signaling protocol accommodates extensions of the Diameter based signaling protocol. The computer readable medium is operable to allow for information to be dynamically processed by altering rendering characteristics at runtime. The computer readable medium is at least one of maintained, deployed, created and supported on a computing infrastructure by a service provider.

In another aspect of the invention, a method for rendering visual services comprises providing a computer infrastructure being operable to: register visually rendered services profile notifications using Sh message set with Diameter protocol; notify an agent of any changes that may occur with respect to specific subscribers of the visually rendered services; and request and/or make rendering changes when a data session is active or when a next data session is made active on a mobile data services network-based on the registered visually rendered services profile notifications.

In another aspect of the invention, a system, comprises a services plane comprising a rendering agent. The rendering agent is configured to register visually rendered services profile notifications using Sh message set with Diameter protocol to an HSS storage system.

In another aspect of the invention, a computer program product for rendering visual services is provided. The computer program product comprises: a computer readable medium; first program instructions to register for visually rendered services profile notifications using Sh message set with the Diameter based signaling protocol; second program instruction to support HSS based subscriber profiles that pertain to visual characteristics of the subscriber centric, visually rendered, services; and third program instructions to activate and deactivate subscriber centric, visually rendered, services using a Diameter based signaling protocol. The first, second and third program instructions are stored on the computer readable media.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
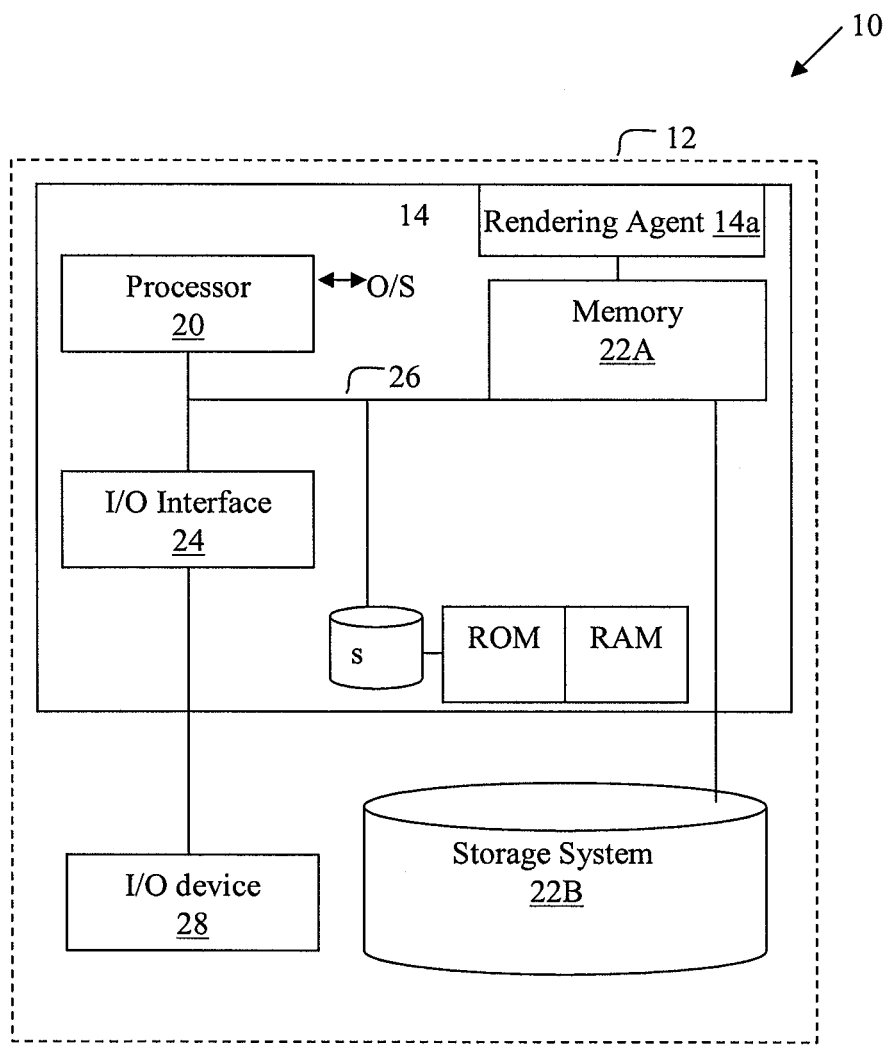
FIG. 1 an illustrative environment for implementing the steps in accordance with the invention.

The invention generally relates to a system and method of using Diameter based signaling to activate and deactivate subscriber centric, visually rendered, revenue generating services. In embodiments, the present invention supports HSS (Home subscriber Server) based subscriber profiles that pertain to visual characteristics, such as the characteristics of a WAP page (Wireless Access Protocol) or a traditional portal rendered browser, such as a JSR 168 compliant portlet. This is particularly advantageous since many telecommunications services (especially in the wireless carrier domain) are going to be visually rendered. For example, such services include:
  A location based service that allows for subscribers on a chat list to be located visually in near real time;
  A presence service that visually dynamically displays the status of buddies when they are active on the telecommunications network (e.g., when a data service card is activated and connects to the mobile IP network, or when a mobile phone starts a voice session); and/or
  A search service that visually, asynchronously, returns results based on changing location.

More specifically, the present invention provides a method and system for using Diameter based signaling to activate and deactivate visually rendered services in an IP Multimedia Subsystem (IMS) based reference implementation. Under the present invention, the system activates and deactivates with an existing HSS (Home Subscriber Server) infrastructure using a Sh sub-protocol. In embodiments, the system leverages an existing provisioning and activation mechanism that may exist in an IMS network to support visually rendered services by integrating an existing master subscriber profile in the IMS network into a domain or web based visually rendered services. In another embodiment, the system and method handles authorization specifically via the Diameter protocol for visually rendered services. In yet another embodiment, the system and method is capable of provisioning and activating portlet functionality for wireless devices via the IMS subsystem using extension to the Diameter protocol which consolidates user accesses into a unified call. The implementation of the present invention also relies on a model that is notification based, requiring prior registration using Diameter, allowing for a non-invasive/minimally invasive implementation approach.

The traditional model for provisioning and activation requires information from the HSS to be replicated to the LDAP and to legacy repository for non-IMS based services. Because of this, the Portal must dip the LDAP for its authorization and authentication of each portlet and service offered by a portlet. This model does not provide a solid transition to an IMS based network since the provisioning and activation system still needs to provision to the LDAP for the portal to render content. In addition, adding provisioning points increases the likelihood of additional provisioning synchronization problems where one set of services may render before the other services are rendered.

Comparatively, the present invention removes the duplicate replication of information from the HSS to the LDAP by creating a single replication to the Legacy Home Location Register (HLR). The replication is also reversed as the HLR now replicates primarily to the HSS. In the present invention, the portal now authenticates to the HSS via Diameter protocol instead of the traditional LDAP call. This removes the legacy systems from directly interfacing to the Portal, and it correctly aligns the portal to an IMS network. Also, where current models must also provision back to the LDAP via the LDAP protocol, the method and system of the present invention ensures that voice and visually rendered services can be provisioned simultaneously. It is also assumed that during the implementation of the IMS based architecture, carriers have accounts for HSS based provisioning and SIP based activation.

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:
  an electrical connection having one or more wires,
  a portable computer diskette,
  a hard disk,
  a random access memory (RAM),
  a read-only memory (ROM),
  an erasable programmable read-only memory (EPROM or Flash memory),
  an optical fiber,
  a portable compact disc read-only memory (CDROM),
  an optical storage device,
  a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 includes a Rendering Agent (module or program code) 14a configured to make the computing device 14 operable to perform the services described herein. The Rendering Agent 14a can be implemented as one or more program code stored in memory 22A as separate or combined modules. In an illustrative example, the Rendering Agent 14a provides preference information to the carrier centric central subscriber services repository (e.g., IMS compliant HSS). The preference information may contain visually rendered revenue generating services such as information pertaining to the layout of a WAP browser rendered page or a page based on portlets.

In implementation, the Rendering Agent 14a, for example, makes or request profile changes in the HSS repository (e.g., storage system 22B) and then ensures that Diameter communications around it accommodate these extensions. To do this, the Rendering Agent 14a leverages the Diameter protocol enabled "Sh" message set to communicate preference changes pertaining to subscribed services that are visually rendered. The Rendering Agent 14a also allows for this information to be dynamically processed by altering rendering characteristics at runtime. This can be accomplished for blended or composite visually rendered revenue-generating services that have a significant rendering requirement.

In further embodiments, the Rendering Agent 14a can provision/deprovision and activate visually rendered services such as a JSR 168 portlet, specifically to integrate with an IMS core based on an HSS repository. The ability to provision and activate portlet functionality for wireless devices via the IMS subsystem using the extension to the Diameter protocol consolidates the users access into a unified call. The carrier provisioning and activation processes can also account for these new categories of services.

The Rendering Agent 14a can integrate the existing master subscriber profile in an IMS network (an HSS) into the domain or web based visually rendered services. Accordingly, in embodiments, the present invention could be used to provision the subscriber, but actual notification into the domain can be performed via the Diameter protocol, possibly eliminating the need to have a subscriber profile such as used in a portal database.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, the handheld device, PDA, handset, etc. In particular, the I/O device 28 may be used to display a visual representation (service) in accordance with the invention such as, for example, icon based click on lists or other visual services.

In general, the processor 20 executes computer program code, which can be stored in the memory 22A and/or storage system 22B. While executing the computer program code, the processor 20 can read and/or write data to/from memory 22A, storage system 22B, and/or I/O interface 24. The program code executes the processes of the invention. The storage system 22B may be an HSS database. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. These customers may be, for example, a mobile user or a third party requesting content, or information about another user. In return, the service provider can receive payment from the customer(s) under a subscription and/or fee agreement and/or the service provider can receive payment from the sale of advertising content to one or more third parties.

Exemplary Processes and System Architecture

Figure 2:
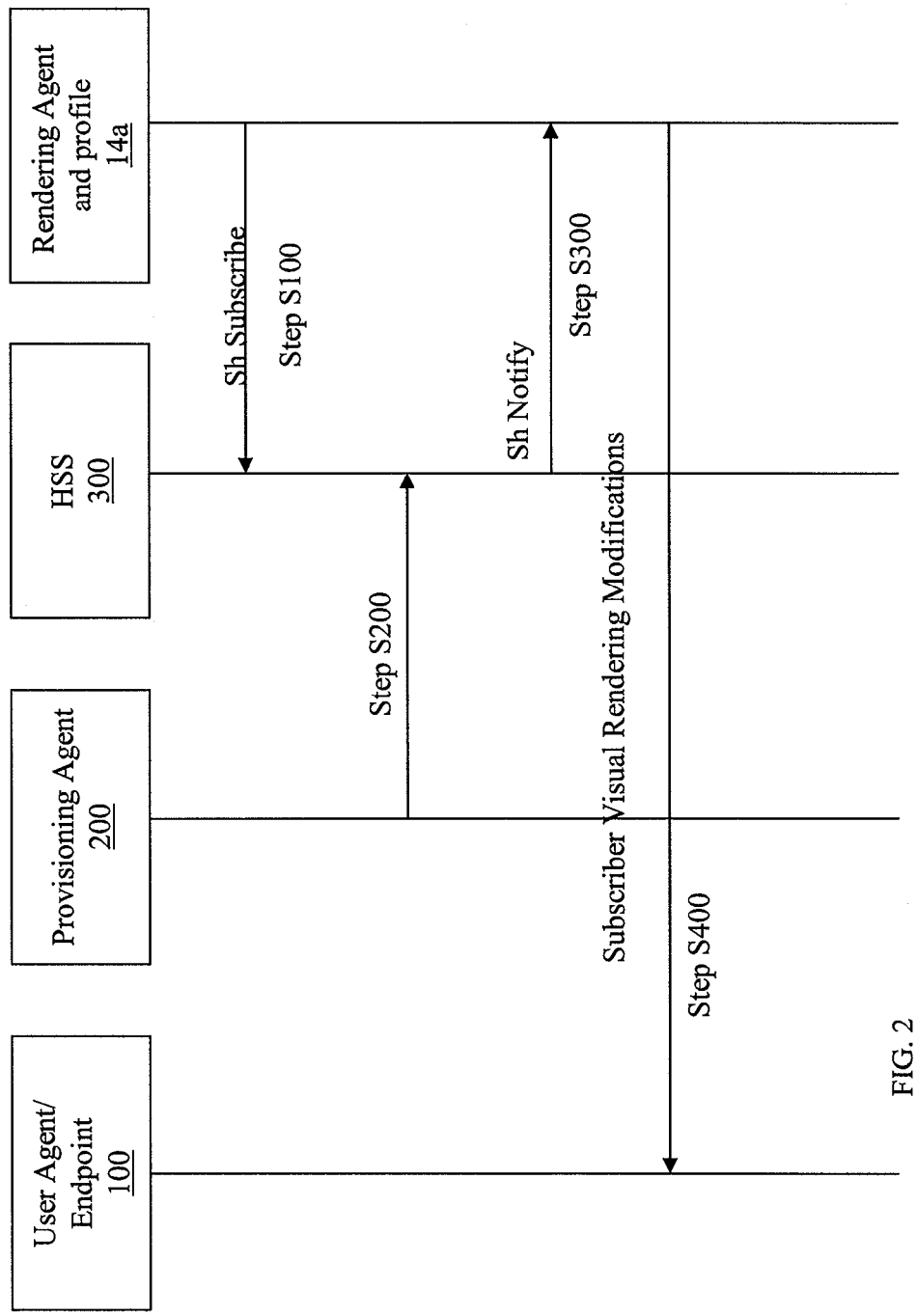
FIG. 2 is a swim lane diagram implementing exemplary processes in accordance with aspects of the invention.

FIG. 2 illustrates exemplary processes in accordance with the present invention. The steps of FIG. 2 may be implemented on the computer infrastructure of FIG. 1, for example. The swim lane diagram in FIG. 2 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flowchart, and combinations of the flowchart illustrations can be implemented by special purpose hardware-based systems that perform the specified functions or acts, or combinations of special purpose hardware and computer instructions and/or software, as described above.

More specifically, FIG. 2 shows a swim lane diagram implementing exemplary processes in accordance with aspects of the invention. The swim lane diagram shows four "players": the user agent/end point 100, the profiling agent 200, the HSS 300 and the rendering agent 14a. The user agent/end point 10 may be any end user device such as, for example, a PDA, a cellular telephone or other portable computing device. In embodiments, the user agent is depicted as the I/O device 28 of FIG. 1. As such, the user device is where the service is actually rendered.

The provisioning agent 200 is the subscribing agent. More specifically, the user agent will sign up with a service through the provisioning agent 200 such as, for example, a service provider. The provisioning agent 200 provides the subscriber profile or other service to the HSS, which registers the user agent with the service.

The HSS 300 is a master user database that supports the IMS network entities that actually handle calls. The HSS 300 contains the subscription-related information (user profiles), performs authentication and authorization of the user, and can provide information about the user's physical location. It is similar to the GSM home Location Register (HLR) and Authentication Centre (AUC).

The rendering agent 14a renders the services of the invention and may be provided, for example, by a service provider. In embodiments, the rendering agent 14a is the web infrastructure that is associated with the service that visually renders the service by communicating with the telecommunications' infrastructure. As described herein, the rendering agent 14a may be notified of any changes by the HSS.

At step S100, the rendering agent registers for visually rendered services profile notifications using the Sh message set with the Diameter protocol. The HSS is thus notified to inform the rendering agent of any changes that may occur with respect to specific subscribers. At step S200, the provisioning agent sends subscriber service changes for the visually rendered services to the HSS, using the Diameter protocol. As and when these changes to the subscriber services profile are made, the Diameter infrastructure notifies the interested parties, which in this case includes the rendering agent at step S300. At step S400, the rendering agent dynamically makes and/or requests the rendering changes necessary, in the event that an actual data session is active, or when the next data session is made active, on the mobile data services network.

Figure 3:
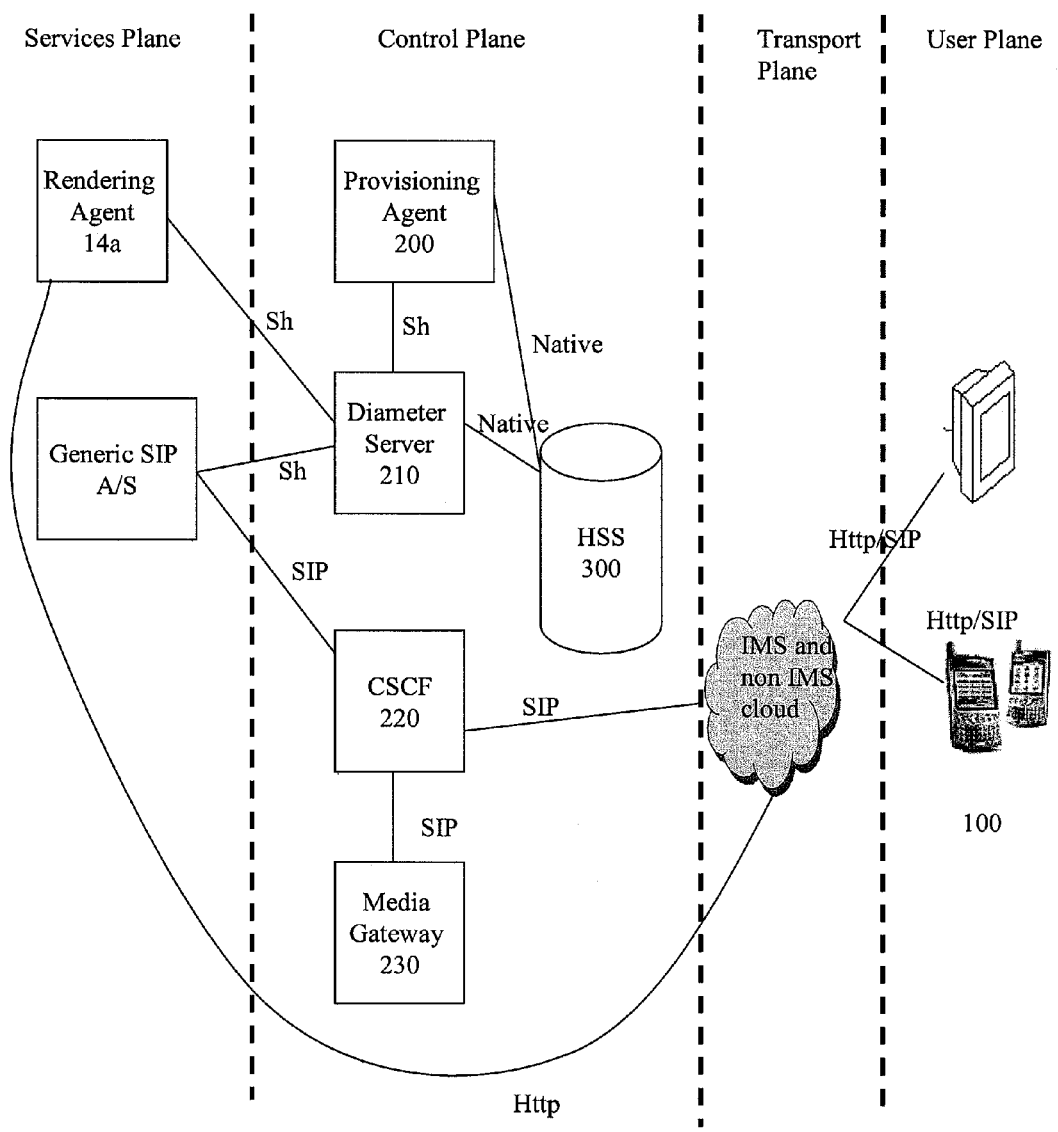
FIG. 3 shows an overview of the architecture in accordance with aspects of the invention

FIG. 3 shows an overview of the architecture in accordance with aspects of the invention. In particular, the architecture is shown in four planes: services plane; control plane; transport plane; and user plane. The services plane includes the rendering agent 14a and a generic SIP A/S. As should be understood by one of ordinary skill in the art, a generic SIP A/S is an application-layer control protocol or signaling protocol for Internet Telephony. SIP can establish sessions for features such as audio/videoconferencing, interactive gaming, and call forwarding to be deployed over IP networks, thus enabling service providers to integrate basic IP telephony services with Web, e-mail, and chat services. In addition to user authentication, redirect and registration services, SIP supports traditional telephony features such as personal mobility, time-of-day routing and call forwarding based on the geographical location of the person being called.

The control plane includes the provisioning agent 200 and Diameter Server 210 both communicating with the HSS database 300 via a native protocol. The Diameter Server 210 is also used as a conduit for communication between the HSS database 300 and the rendering agent 14a and the generic SIP A/S. These communications use a Sh protocol. The provisioning agent 200 also communicates with the Diameter Server 210 via the Sh protocol. As discussed above, the rendering agent 14a registers the user for the visually rendered services and the provisioning agent 200 sends subscriber service changes for the visually rendered services to the HSS.

The control plane also includes a CSCF (Call Session Control Function) 220 and media gateway 230. The CSCF 220 provides session control for subscribers accessing services within the IMS network. In essence the CSCF is a SIP Server which has responsibility for interacting with network databases such as the HSS for mobility. The media gateway 230 includes components that ensure that media is delivered properly to all of the end points. The generic SIP A/S communicates with the CSCF 220 via a SIP, as does the media gateway 230.

The transport plane includes an IMS network and non IMS network. The rendering agent communicates with the IMS and/or non IMS network via Http. The CSCF 220 communicates with the IMS network and/or non IMS network via a SIP message.

The user plane includes the user or end point devices 100. The end point devices 100 communicate with the IMS network and non IMS network via Http/SIP. In implementation, using the Diameter Server and rendering agent it is now possible to provide visually rendered services to the end point devices 100 in accordance with the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for rendering visual services, comprising: providing a computer infrastructure being operable to: register an agent with a Home Subscriber Server (HSS) for visually rendered services profile notifications using a first Sh message set with Diameter protocol, wherein the registering notifies the HSS to inform the agent of any changes that occur with respect to specific subscribers; notify the agent of any changes that occur with respect to profiles of the specific subscribers of the visually rendered services using a second Sh message set with the diameter protocol; and request and/or make rendering changes when a data session is active or when a next data session is made active on a mobile data services network based on the registered visually rendered services profile notifications, wherein the computer infrastructure is operable to: receive subscriber service changes for the visually rendered services to the HSS, using the Diameter protocol; and notify the agent of the subscriber service changes.

2. The method of claim 1, wherein the computer infrastructure is at least one of maintained, deployed, created and supported on a computing infrastructure by a service provider.

* * * * *